(12) United States Patent
Lindsey

(10) Patent No.: US 6,384,861 B1
(45) Date of Patent: May 7, 2002

(54) IMAGE CAPTURE DEVICE HAVING CURSOR GENERATING AND CONTROL APPARATUS

(75) Inventor: Todd D. Lindsey, Sioux City, IA (US)

(73) Assignee: Gateway, Inc, N. Sioux City, SD (US)

( * ) Notice: Subject to any disclaimer, the term of this patent is extended or adjusted under 35 U.S.C. 154(b) by 0 days.

(21) Appl. No.: 09/218,514

(22) Filed: Dec. 22, 1998

(51) Int. Cl.[7] .............................................. H04N 5/225
(52) U.S. Cl. ...................................... 348/169; 345/157
(58) Field of Search ................................ 345/156, 157, 345/161, 164, 173, 158, 113, 145, 146, 207; 434/428, 429, 47, 65, 308, 314, 315, 19, 20; 348/189, 170; 382/103, 142

(56) References Cited

U.S. PATENT DOCUMENTS

| | | | | |
|---|---|---|---|---|
| 4,315,282 A | * | 2/1982 | Schumacher | 348/141 |
| 4,488,876 A | * | 12/1984 | Thomas et al. | 434/20 |
| 4,794,388 A | | 12/1988 | Matthews | 340/731 |
| 5,073,819 A | | 12/1991 | Gates et al. | 358/107 |
| 5,117,112 A | * | 5/1992 | Ito | 250/311 |
| 5,223,934 A | | 6/1993 | Hong | 358/209 |
| 5,396,281 A | * | 3/1995 | Maeda | 348/141 |
| 5,500,936 A | | 3/1996 | Allen et al. | 395/156 |
| 5,563,628 A | | 10/1996 | Stroop | 345/156 |
| 5,568,987 A | | 10/1996 | Franz | 400/490 |
| 5,648,781 A | * | 7/1997 | Choi | 341/176 |
| 5,680,159 A | | 10/1997 | Lunetta | 345/173 |
| 5,893,053 A | * | 4/1999 | Trueblood | 702/187 |
| 6,199,042 B1 | * | 3/2001 | Kurzwell | 704/260 |

FOREIGN PATENT DOCUMENTS

| | | | | |
|---|---|---|---|---|
| JP | 04368081 A | * | 12/1992 | H04N/5/782 |
| JP | 08223524 A | * | 8/1996 | H04N/5/907 |
| JP | 10068992 A | * | 3/1998 | G03B/17/18 |

OTHER PUBLICATIONS

IBM DB, vol. 18, No. 7, pp 2302–2303.*
IBM DB, vol. 33, No. 3B, pp. 116–118.*

* cited by examiner

Primary Examiner—Richard Hjerpe
Assistant Examiner—Alexander Eisen
(74) Attorney, Agent, or Firm—Kenneth J. Cool; Kevin E. West; Suiter & Associates PC

(57) ABSTRACT

An image capture device having apparatus for superimposing a cursor onto a recorded image wherein the position and movement of the cursor on the image may be controlled by a user of the image capture device. The image capture device includes a cursor control assembly for controlling the position of the cursor with respect to the image and a cursor generator for generating a cursor which is superimposed onto the image for recording to the storage medium.

24 Claims, 7 Drawing Sheets

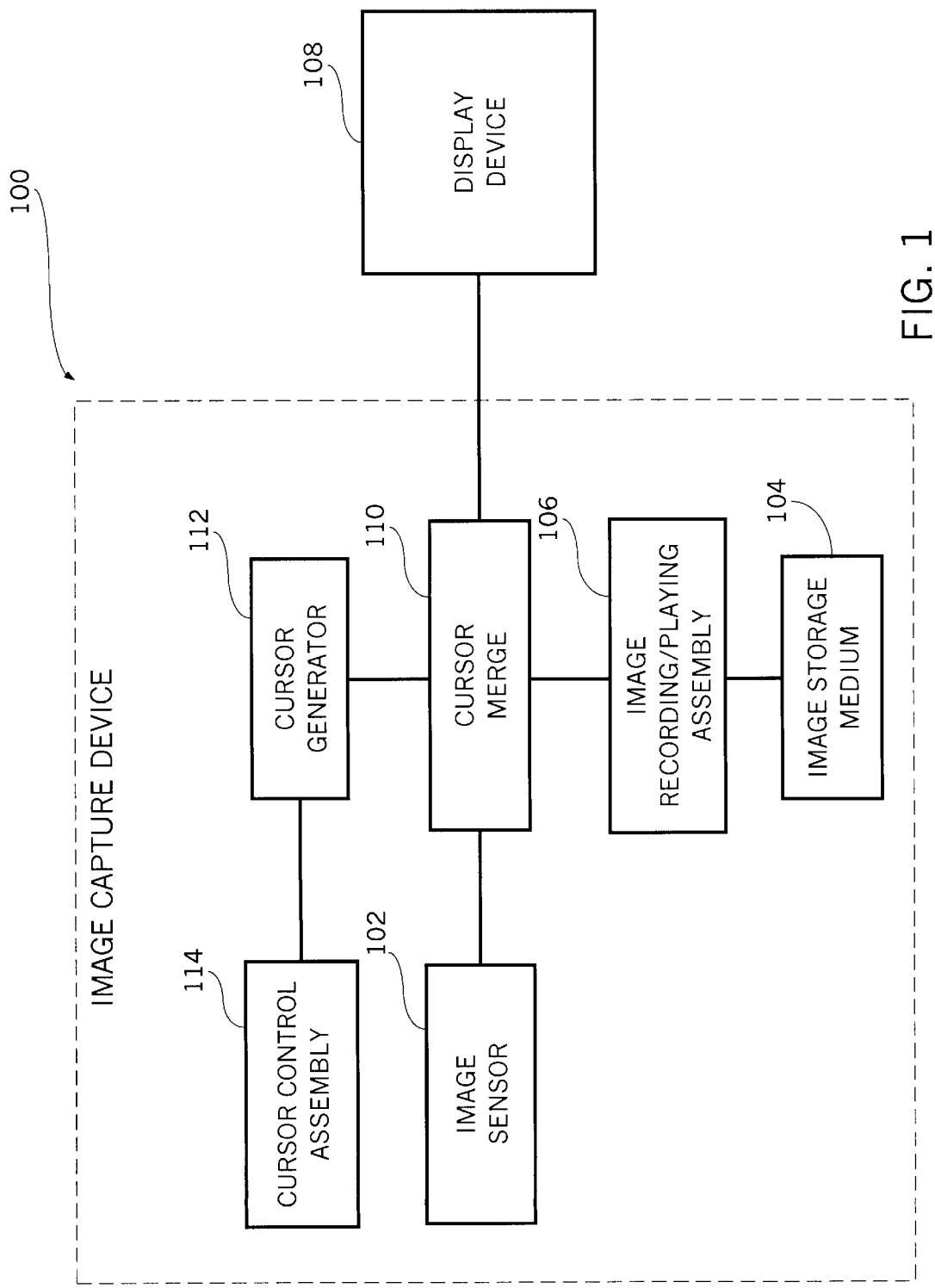

IMAGE CAPTURE DEVICE HAVING CURSOR GENERATING AND CONTROL APPARATUS

FIELD OF THE INVENTION

The present invention relates generally to image capture devices such as video cameras (camcorders), digital cameras, video cassette recorders (VCR), optical disc players, and the like, and more particularly to an image capture device having apparatus for superimposing a cursor onto a recorded image wherein the position and movement of the cursor on the image may be controlled by an operator of the image capture device.

BACKGROUND OF THE INVENTION

Image capture devices such as video cameras, digital cameras, and the like are well known in the art for recording images (i.e., video images, digital still images, etc.) of a subject or event so the subject or event may be viewed at a later time. Such images are recorded to a storage medium such as a videocassette tape, optical disc, memory device, or the like. The images may then be viewed or played by coupling the image capture device to a viewing device (i.e., a monitor, television, etc.), or by transferring the storage medium to a playback device such as a video cassette recorder (VCR) or optical disc player.

Often it is desirable to provide a narrative describing a subject or event being recorded. This narrative may, for example, be recorded as audio information stored to the storage medium. When the image is later viewed by an audience, the narrative may help viewers understand the content of the image or identify subject matter (i.e., persons, places, objects, etc.) recorded therein. Similarly, when a previously recorded image (which has no recorded narrative) is displayed, it may be desirable to have a knowledgeable individual provide such a narrative to the other viewers of the image.

Present image capture devices do not provide a means for pointing out or identifying subject matter of a recorded image. Thus, if images of several persons or objects are recorded together in a video, for example, identification of a particular one of the persons or objects may be difficult based only on the narrative. When playing the video, the operator (or another individual) may be forced to identify the subject of his or her narrative by physically pointing to the subject on the screen of the video monitor. To many this action is undesirable since it lessens the viewing experience of the audience. Consequently, it would be advantageous to provide an image capture device having apparatus which allows an operator to identify particular subjects such as a persons, objects, or the like in a recorded image.

SUMMARY OF THE INVENTION

Accordingly, the present invention is directed to a novel image capture device capable of superimposing a cursor onto a recorded image (i.e., a video image, a digital still image, etc.) wherein the position and movement of the cursor over the image may be controlled by a user of the image capture device. The image capture device includes a cursor generator for generating a cursor which is superimposed onto the image as it is recorded or played and a cursor control assembly for controlling the position and movement of the cursor. The image, including the superimposed cursor, may be displayed to an audience via a display device, or recorded to a storage medium to be viewed at a later time. The image capture device may be utilized as an input/output device for a computer-based information handling system.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which:

FIG. 1 is a block diagram illustrating an image capture device having cursor generating and control apparatus in accordance with the present invention;

DETAILED DESCRIPTION OF THE INVENTION

Figure 2A:
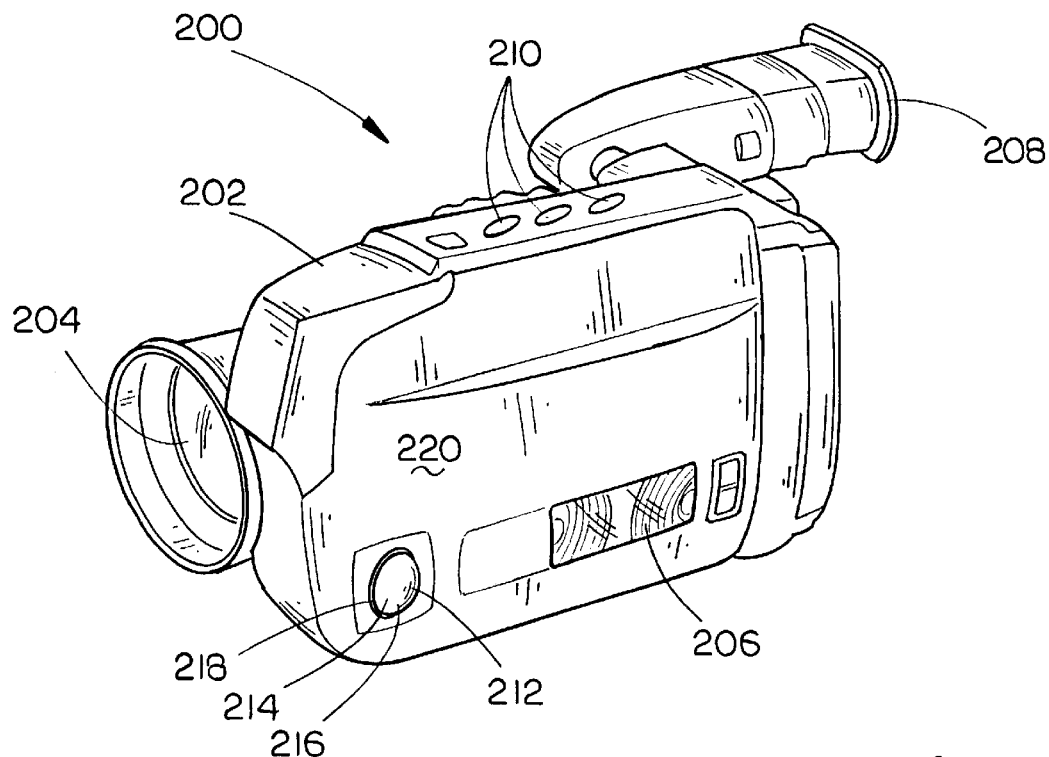
FIGS. 2A and 2B are isometric views of video cameras employing cursor generating and control apparatus in accordance with the present invention.

Reference will now be made in detail to the presently preferred embodiments of the invention, examples of which are illustrated in the accompanying drawings.

Referring now to FIG. 1, a block diagram is shown illustrating an image capture device in accordance with the present invention. The image capture device 100 includes apparatus for superimposing a cursor onto a recorded image (i.e., a video image, a digital still image, etc.) wherein the position and movement of the cursor over the recorded image may be controlled by a user of the image capture device 100.

As shown in FIG. 1, the image capture device 100 includes an image sensor 102 which generates electrical signals representing an image to be recorded. The image information (e.g., the electrical signals representing the image) may be stored to a storage medium 104 via an image recording and playing assembly 106. The image recording and playing assembly 106 may also play the recorded image information from the storage medium 104 so that the image may be displayed via a display device 108 such as a monitor, television, computer display, etc., or printed via a printer (not shown). Preferably, the image recording and playing assembly 106 is also capable of storing and playing audio information (i.e., sound, narrative, etc.) associated with the image (i.e., sound generated by the subject, narration describing the subject, etc.).

A cursor generator 110 is interconnected with the image recording and playing apparatus 106 via a cursor merge circuit 112. The cursor merge circuit 112 may receive electrical signals representing the image from the image sensor 102. The cursor merge circuit 112 may then superimpose a cursor generated by the cursor generator 110 onto the image. Alternately, the cursor merge circuit 112 may superimpose a cursor generated by the cursor generator 110 onto a pre-recorded image as it is played from the storage medium 104 and displayed via the display device 108 (or printed via a printer). When the image is viewed by an audience, the cursor is displayed over the image so particular subjects whose likenesses are recorded therein may be identified.

A cursor control assembly 114 is coupled to the cursor generator 110. Preferably, the cursor generator 110 is responsive to the cursor control assembly 114 for controlling the movement and position of the cursor with respect to the image. Thus, a user of the image capture device 100 may operate the cursor control assembly 114 to move the cursor over the image to identify desired areas or points within the image. Preferably, the cursor generated by the cursor generator 110 comprises a graphical or pictorial symbol such as a cross hair symbol, a pointer, an arrow, an alphanumeric character, an illustration, or the like having a size and color generally viewable over the image.

Exemplary image capture devices 100 which may employ the present invention include video cameras (camcorder), digital cameras, video cassette recorders (VCR), video disc players, DVD (Digital Versatile Disc) players, CD (Compact Disc) players, and the like. Such image capture devices may be capable of recording and playing still images or video, and may use a variety of storage media 104 including, but not limited to, magnetic tape (i.e., videocassette tape), optical discs, magnetic disks, and semiconductor memory devices.

Figure 2B:
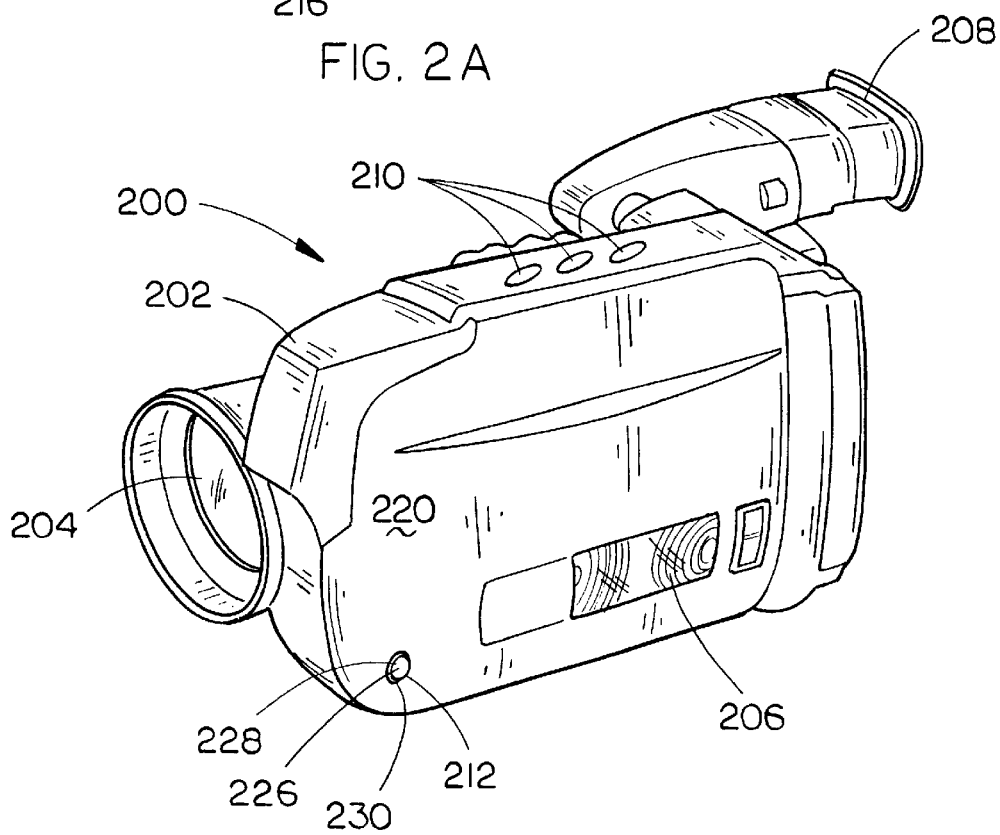

Referring now to FIGS. 2A and 2B, an exemplary embodiment of the present invention is shown wherein the image capture device comprises a portable video camera or camcorder. Such video cameras 200 include a compact, hand-held housing 202 supporting a lense system 204 for focusing incident light from a subject (i.e., a person, object, place, etc.) onto one or more image sensors such as a CCD (Charged Coupled Device) array, or the like (not shown). The image sensors convert the focused light into electrical signals which are processed and stored to the storage medium 206. Typically, the storage medium 206 employed by such video cameras 200 comprises a magnetic tape videocassette having formats such as DV (Digital Video), VHS (Video Home System), S-VHS (Super Video Home System), VHS-C (Video Home System Compact), S-VHS-C (Super Video Home System Compact), Betacam, 8 mm, or Hi8. However, it should be appreciated that substitution of other storage media such as optical discs, magnetic disks, semiconductor memory devices, or the like by one of ordinary skill in the art would not depart from the scope and spirit of the invention.

The video camera 200 may be capable of recording audio information to the storage medium 206. This audio information may include, for example, sound generated by the subject being recorded or narrative generated by the video camera's operator or another individual. The audio information may be recorded simultaneously with the video information, or may be recorded to the storage medium 206 over the video information at a later time.

The video camera 200 may include a viewfinder 208 which allows the user to view the subject being recorded as it will appear in the video. The viewfinder 208 aids the operator in aiming and adjusting the video camera 200, and may be used to focus the lense system 204 during recording.

The viewfinder may also be used as a monitor to play back video information previously recorded onto the storage medium 206. For example, the viewfinder 208 may comprise a small liquid crystal display (LCD) video monitor (typically ranging for 2 inches to 4 inches in diagonal). When used to display a video recorded to the recording medium 206, this monitor may provide sufficient size and resolution for viewing by the operator and a small number of other viewers. The video camera 200 may include a plurality of controls 210 for controlling recording and playback of video information by the video camera 200. These controls 210 may, for example, control conventional recording and playback functions such as record, play, stop, fast forward, rewind, pause, exposure, focus, shutter speed, zoom, fade, white balance, and the like.

The video camera 200 is capable of superimposing a cursor onto the video information as it is stored to the storage medium 206. The video camera 200 includes a cursor generator for generating a cursor which may be superimposed onto the video information via a cursor merge circuit (see FIG. 1). Preferably, the cursor merge circuit superimposes the cursor, generated by the cursor generator, onto the video information as the information is recorded to the recording medium 206. Alternatively, the video information may be originally recorded to the recording medium without the cursor. The cursor merge circuit may then superimpose the cursor over the video information as it is played and displayed via a display device (see FIG. 3A).

The video camera 200 may include a cursor control assembly 212 which may be manipulated by the operator of the video camera 200 for controlling the position and movement of the cursor. For example, the operator may position the cursor over the image of a particular individual or object within the video so that the person or object may be identified via a narrative recorded to the storage medium 206 as audio information. The cursor control assembly 212 may also be utilized in combination with other of the video camera's controls 210 to control functions of the video camera 200. Preferably, the cursor need not be recorded to the video when used only to control functions of the camera. For example, the cursor control assembly 212 may be utilized to move the cursor to an area of a recorded image to receive a special effect. Such special effects are commonly provided by state-of-the-art video cameras, and include enlargement, fading, zooming, and the like. Preferably, the cursor generated by the cursor generator comprises a graphical or pictorial symbol such as a cross hair symbol, a pointer, an arrow, an alphanumeric character, illustration or the like having a size and color generally viewable over the image.

As shown in FIG. 2A, the cursor control assembly 212 may comprise a rotating ball type pointing device or "trackball" 214. The trackball 214 includes a ball 216 which is held within an aperture 218 in the video camera's housing 220 so that it is freely rotatable in all directions. When an operator rotates the ball 216, electronic encoders (not shown) sense the rotation and generate a signal indicative of the ball's rotation to control movement of the cursor. In this manner, the user may control the position of the cursor with respect to images of specific individuals or objects within the video.

Alternately, as shown in FIG. 2B, the cursor control assembly 212 may be a "pointing stick" 226 type device. The pointing stick 226 includes a stick or shaft 228 which may be pressed in a desired direction by the operator (using his or her fingertip). Force sensors (not shown) such as force-sensitive resistors, strain gauges, or the like may be coupled to the shaft 228 for sensing forces applied to the shaft 228 by the operator. These force sensors generate a signal which causes the cursor to be moved in a corresponding direction over the image. Preferably, the shaft 228 may be located on video camera's housing 220 at a position where it may be conveniently manipulated by the user, and may include an enlarged head or top portion 230 having a roughened covering for providing better contact with the user's fingertip.

Those skilled in the art will recognize that the type of cursor control assembly 212 utilized by the video camera 200 is not limited to the embodiments specifically shown in FIGS. 2A and 2B. For example, the cursor control assembly 212 might include a touch sensitive surface which is responsive to forces induced therein by the user's fingertip. The user may control movement of the cursor over the image in the video by moving his or her fingertip in a corresponding direction over the touch sensitive surface (see FIG. 3A). Another example might include a touch-sensitive screen (i.e., overlaying the video camera's viewfinder) enabling the user to control the movement of the cursor through contact with the image displayed thereon by a stylus or the user's fingertip.

Figure 3A:
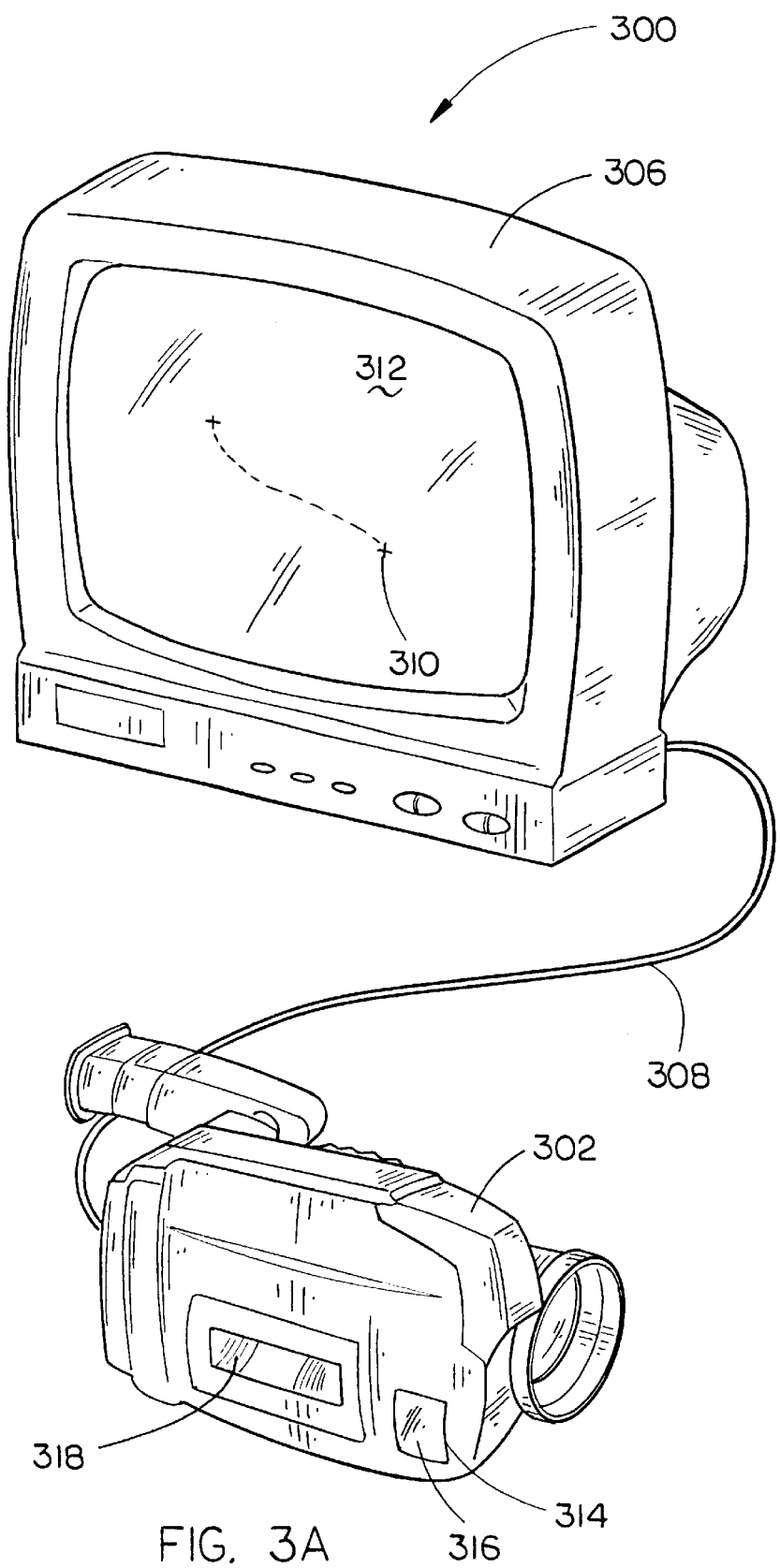
FIGS. 3A and 3B are isometric views of video systems utilizing video cameras in accordance with the present invention.
Figure 3B:
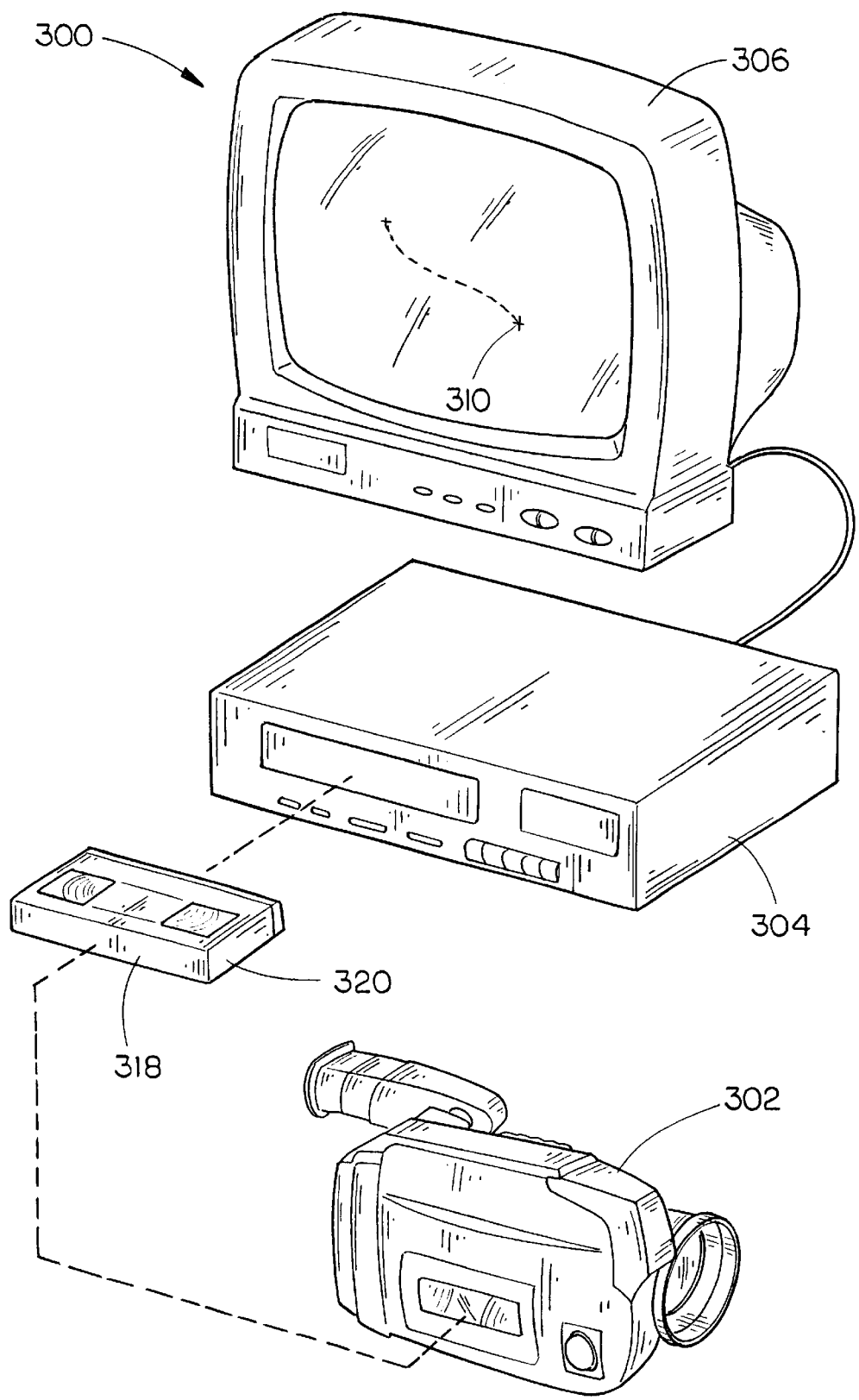

Referring now to FIGS. 3A and 3B, a system utilizing a video camera in accordance with the present invention for displaying previously recorded video information is shown. The system 300 may include a video camera 302, a video playing device 304 (i.e., a video cassette player/recorder (VCR), etc.), and a video monitor 306 (i.e., television, information handling system display, etc.). The system 300 may, for example, be utilized to display video and audio information previously recorded by the video camera 302.

As shown in FIG. 3A, the video camera 302 may be coupled directly to the video monitor 306 via a coupling apparatus 308 such as a cable, wire, or the like. The video camera 302 may then play the previously recorded video so that it may be displayed via the monitor 306. A cursor generator within the video camera 302 may generate a cursor 310 which may be superimposed onto the video by a cursor merge circuit (see FIG. 1). Preferably, the cursor 310 comprises a graphical or pictorial symbol such as a cross hair symbol, a pointer, an arrow, an alphanumeric character, illustration or the like having a size and color generally viewable over an image 312 generated by playing the video.

The video camera 302 may include a cursor control assembly 314. Preferably, the cursor control assembly 314 is manipulated by the user of the video camera 302 for controlling movement of the cursor 310 over the image 312. As shown in FIG. 3A, the cursor control assembly 314 may include a touch sensitive surface 316 which is responsive to forces induced therein by the operator's fingertip. By sliding his or her fingertip in a desired direction over the surface 316, the operator may cause the cursor 310 to be moved in a corresponding direction over the image 312.

The cursor 310 may be superimposed over the video information as the video is recorded by the video camera 302. The cursor 310 is thus stored as part of the video information recorded to the storage medium 318. The video camera 302 may then be utilized to play the recorded video so that the video information, having the cursor 310 superimposed thereon, may be displayed to an audience via the monitor 306. Alternatively, the video may be recorded to the storage medium 318 without having a cursor overlaid thereon. The cursor 310 may then be superimposed over the video information as the video information is displayed on the monitor 306. Thus, the cursor 310 is not recorded to the storage medium 318 so that the previously recorded video information remains unaltered. An operator of the video camera 302 may use the cursor control assembly 314 to control movement of the cursor 310 over the image 312 displayed via the monitor 306. For example, as the video is displayed to an audience, the operator may utilize the cursor control assembly 314 to move the cursor 310 over the image 312 displayed on the monitor 306 to point out particular persons, objects, or the like.

As shown in FIG. 3B, the video camera 302 may record the video information to a storage medium 316 such as a videocassette 320, or the like. Preferably, the cursor 310 is superimposed onto the video as it is recorded by the video camera 302 so that the cursor 310 is recorded as part of the video information stored on the videocassette 320. The videocassette 320 may then be inserted into and played by a video playing device 304 such as a video cassette player/recorder (VCR) or the like so that the video information, having the cursor 310 superimposed thereon, may be displayed via the monitor 306.

Figure 4A:
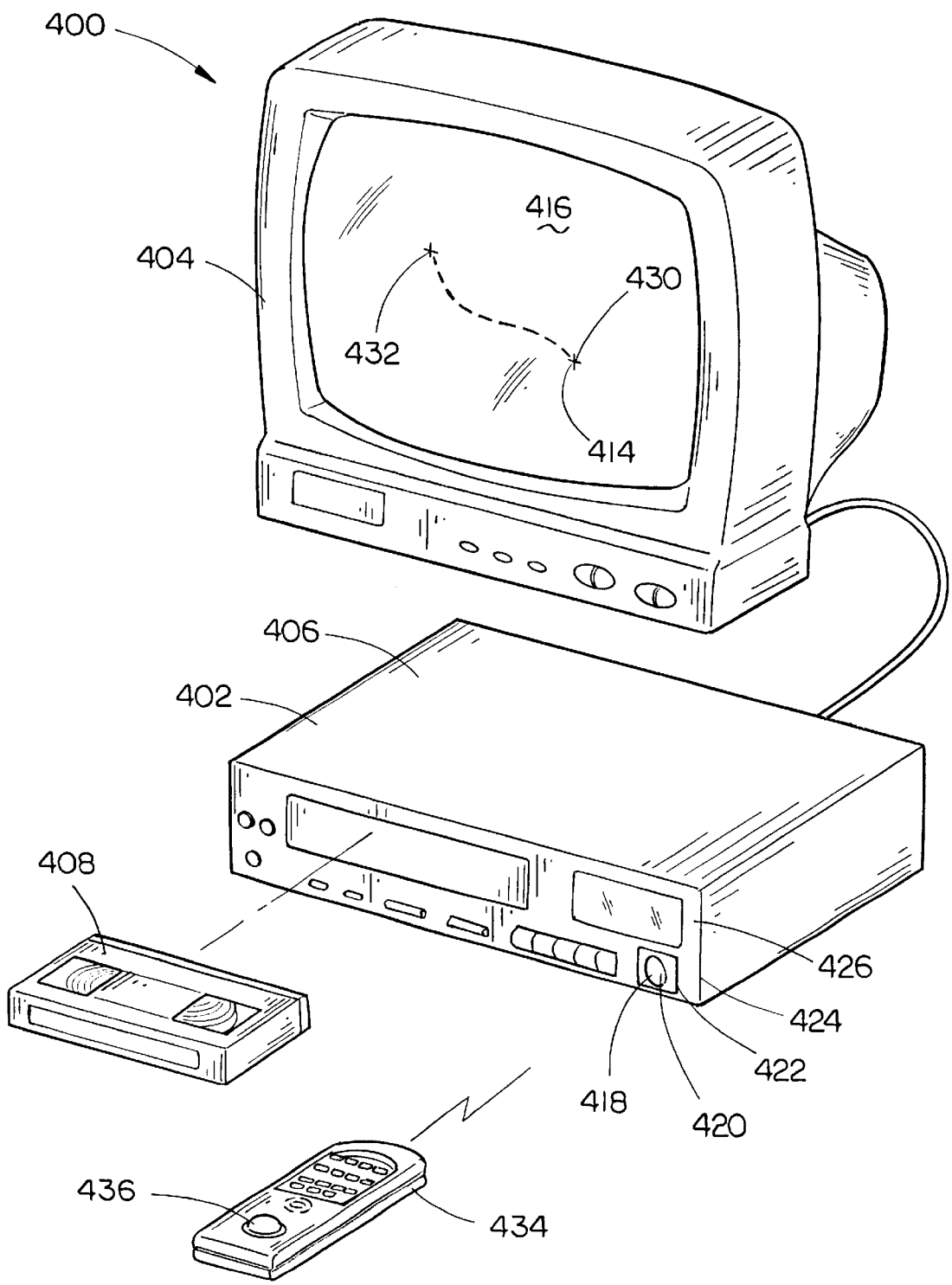
FIGS. 4A and 4B are isometric views of video systems utilizing video playing/recording devices in accordance with the present invention.
Figure 4B:
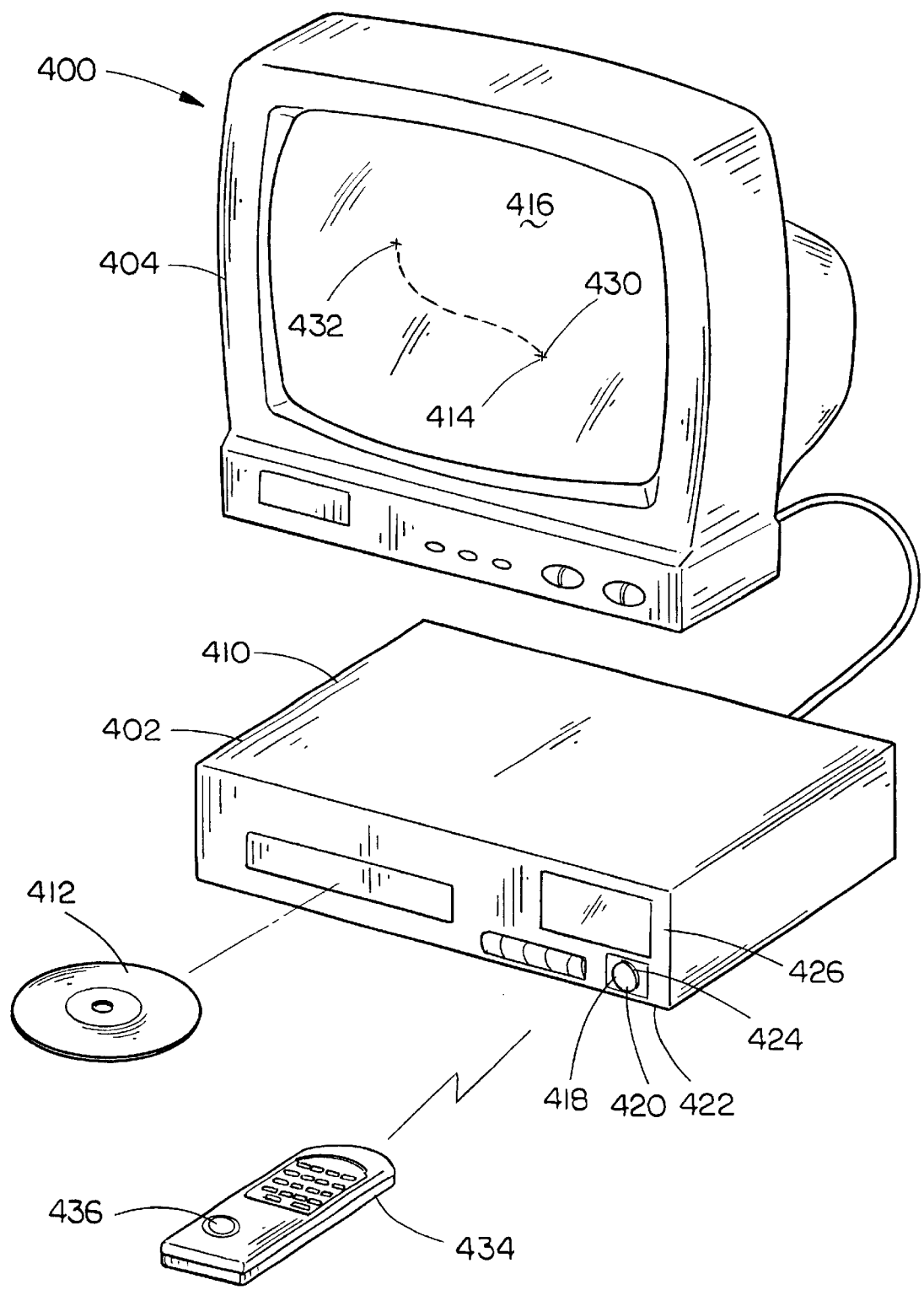

Referring now to FIGS. 4A and 4B, video playing/recording systems utilizing image capture devices according to an exemplary embodiment of the present invention are shown. Such a system 400 may include a video device 402 coupled to a video monitor 404 (i.e., television, computer monitor, etc.).

As shown in FIG. 4A, the video device 402 may be a video cassette playing/recording device such as a video cassette recorder (VCR) 406 capable of playing video and audio information from and recording video and audio information to a videocassette 408. Preferably, the video cassette 408 may have a conventional format such as, for example, VHS (Video Home System), S-VHS (Super Video Home System), VHS-C (Video Home System Compact), S-VHS-C (Super Video Home System Compact), BETA, 8 mm, Hi8, or DV (Digital Video).

Alternatively, as shown in FIG. 4B, the video device 402 may be an optical disc playing/recording device 410 such as a video disc or laser video disc player, DVD (Digital Versatile Disc) player/recorder, CD (Compact Disc) player/recorder, or the like capable of playing video and audio information from and/or recording video and audio information to an optical disc type storage medium 412 such as a video disc, CD, DVD, or the like.

Referring again to both FIGS. 4A and 4B, the video device 402 may include a cursor generator for generating a cursor 414 which may be superimposed onto the video information as it is played (thereby displaying an image 416 on the monitor 404). Preferably, the cursor 414 comprises a graphical symbol such as, for example, a cross hair symbol, a pointer, an arrow, or an alphanumeric character having a size and color generally viewable when overlaid onto the image displayed via the monitor 404.

The video device 402 may also include a cursor control assembly 418. Preferably, the cursor control assembly 418 may be manipulated by a user of the video device 402 for controlling the position of the cursor 414 with respect to the image 416 displayed on the monitor 404. The cursor control assembly 418 may comprise a rotating ball type pointing device or "trackball" 420. The trackball 420 preferably includes a ball 422 which is held within an aperture 424 in the image capture device's housing 426 so that it is freely rotatable in all directions. When a user rotates the ball 422, electronic encoders (not shown) sense the rotation and generate a signal indicative of the ball's rotation to control movement of the cursor 414 over the image 416. The cursor control assembly 418 may be manipulated by a user of the video device 402 for controlling the position of the cursor 414 on the image 416 generated by the video information and displayed via the monitor 404. For example, by manipulating the cursor control assembly 418, an operator may cause the cursor 414 to be moved from a first position 430 to a second position 432 over the image 416. Preferably, the cursor 414 may be moved in a similar fashion to any position overlaying the image 416.

The system 400 may further include a remote control unit 434 which may be coupled to the video device 402 via a wireless link (i.e., infrared (IR), radio (RF), etc). The remote control unit 430 may include a second cursor control assembly 434 which may be used to control the position of the cursor 414 from a remote location (i.e., at some distance from the video device 402). As shown in FIG. 4, the second cursor control assembly 434 may, like the first cursor control assembly 418 disposed on the video device 402, comprise a rotating ball type pointing device or "trackball" 436. However, it should be appreciated that other types of cursor control assembles (e.g., the pointing stick type device as shown in FIG. 1B, the touch sensitive surface type device as shown in FIG. 4A, etc.) may be utilized by the video device 402 and remote control unit 434 to control movement of the cursor 414 over the image 416.

Figure 5:
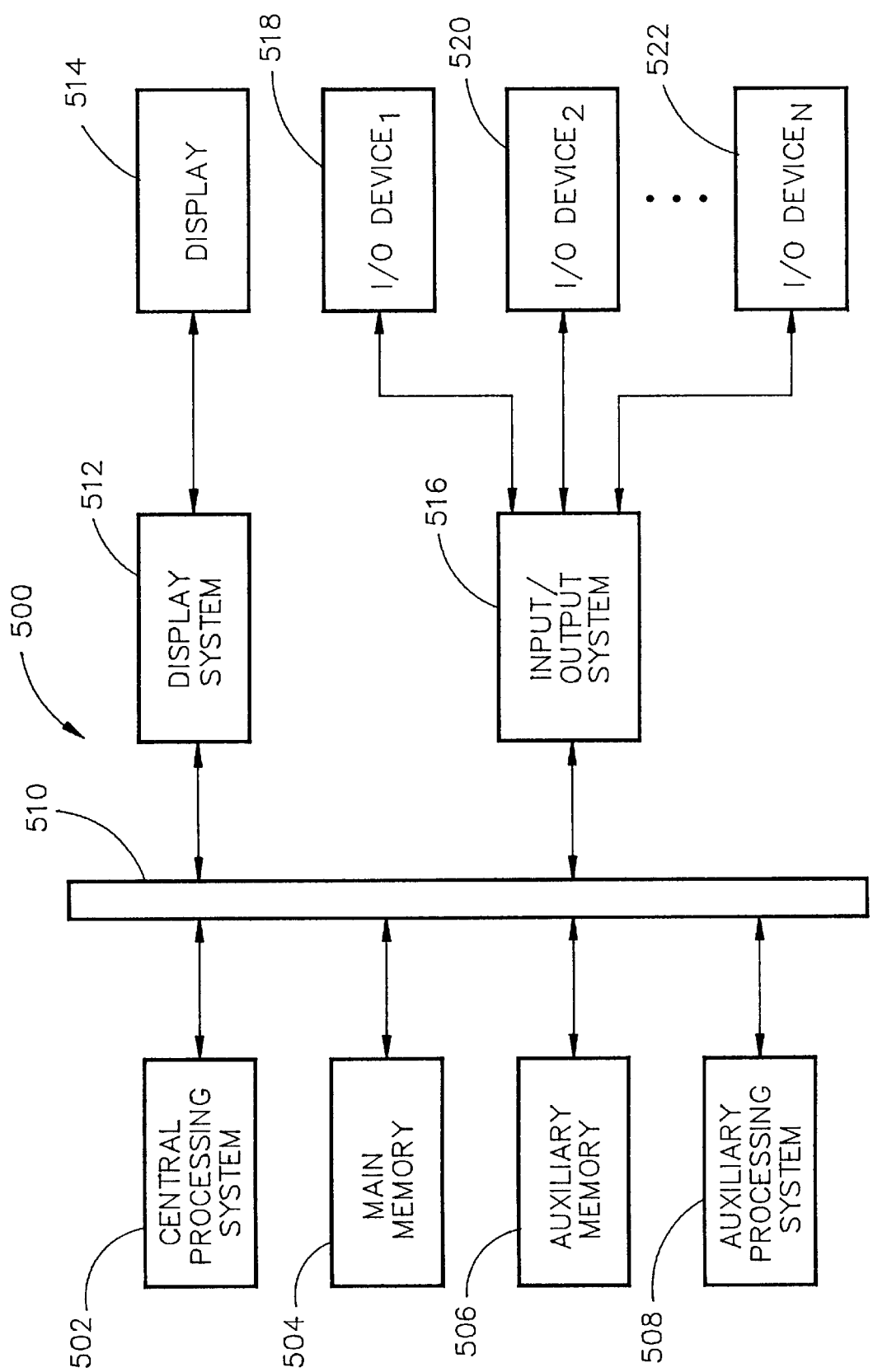
FIG. 5 is a is a block diagram depicting a typical hardware environment of a computer-based information handling system which may employ an image capture device having cursor generating and control apparatus in accordance with the present invention.

Referring now to FIG. 5, a hardware system which may employ an image capture device in accordance with the present invention is shown. The hardware system shown in FIG. 5 is generally representative of the hardware architecture of a computer-based information handling system. The information handling system may be, for example a convergent television/computer system (e.g., PC/TV convergence system) which is adapted to integrate multiple information and entertainment media such as television, telephony, Internet, e-mail, and interactive gaming into a single platform. The information handling system may function as a central control device to control peripheral components of the convergent television/computer system such as an interactive entertainment (video gaming) apparatus, a video cassette recorder (VCR), video camera (camcorder), compact disc or video laser disc players, a digital versatile disc (DVD) or readable/writeable digital versatile disc (DVD+RW) device, or audio equipment such as an audio processor, audio amplifier, surround sound or AC-3 type processor.

The hardware system 500 is controlled by a central processing system 502. The central processing system 502 includes a central processing unit such as a microprocessor or microcontroller for executing programs, performing data manipulations and controlling the tasks of the hardware system 500. Communication with the central processor 502 is implemented through a system bus 710 for transferring information among the components of the hardware system 500. The bus 510 may include a data channel for facilitating information transfer between storage and other peripheral components of the hardware system. The bus 510 further provides the set of signals required for communication with the central processing system 502 including a data bus, address bus, and control bus. The bus 510 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-500, and so on. Other components of the hardware system 500 include main memory 504, auxiliary memory 506, and an auxiliary processing system 508 as required. The main memory 504 provides storage of instructions and data for programs executing on the central processing system 502. The main memory 504 is typically semiconductor based memory such as dynamic random access memory (DRAM) and or static random access memory (SRAM). The auxiliary memory 506 provides storage of instructions and data that are loaded into the main memory 504 before execution. The auxiliary memory 506 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). The auxiliary memory 506 may also include a variety of non-semiconductor based memories, including but not limited to magnetic tape, drum, floppy disk, hard disk, optical, laser disc, compact disc read-only memory (CD-ROM), digital versatile disc read-only memory (DVD-ROM), digital versatile disc random-access memory (DVD-RAM), etc. Other varieties of memory devices are contemplated as well. The hardware system 500 may optionally include an auxiliary processing system 508 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

The hardware system 500 further includes a display system 512 for connecting to a display device 514, and an input/output (I/O) system 516 for connecting to one or more I/O devices 518, 520 up to N number of I/O devices 522. The display system 512 may comprise a video display adapter having all of the components for driving the display device, including video random access memory (VRAM), buffer, and graphics engine as desired. The display device 514 may comprise a cathode ray-tube (CRT) type display such as a monitor or television, or may comprise alternative type of display technologies such as a liquid-crystal display (LCD), a light-emitting diode (LED) display, or a gas or plasma display. The input/output system 516 may comprise one or more controllers or adapters for providing interface functions between the one or more I/O devices 518–522. For example, the input/output system 516 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. The input/output system 516 and I/O devices 518–522 may provide or receive analog or digital signals for communication between the hardware system 500 of the present invention and external devices, networks, or information sources. The input/output system 516 and I/O devices 518–522 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 500 of FIG. 5 by one having ordinary skill in the art would not depart from the scope or the spirit of the present invention.

The image capture device of the present invention may be implemented in the hardware system 500 as an input/output device 518–522 coupled to the input/output system 516. For example, the image capture device may be a digital video camera capable of recording video images to a storage medium in digital video (DV) format. The digital video camera may conform to a state-of-the-art data transfer format such as, for example, IEEE 1394 for digital transfer of video and audio information. In this manner, the video camera may transfer video and audio information directly to the hardware system 500 of the information handling system. The image capture device may alternatively comprise any video playing device such as a video cassette recorder, compact disc (CD) player, digital versatile disc (DVD) player, or the like utilizing cursor generating and control apparatus in accordance with the present invention.

It is believed that the image capture device of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An image capture device, comprising:
   an image sensor for capturing an image of a subject;
   an image recording and playing assembly for recording the image as a video signal to a storage medium;
   a cursor generator for superimposing a cursor onto the video signal as the video signal is recorded the storage medium by said image recording and playing assembly; and
   a cursor control assembly, operable by a user, for controlling the position of the cursor with respect to the image,
   wherein the video signal may be played back from the storage medium along with the superimposed cursor.

2. The image capture device as claimed in claim 1, wherein said image recording and playing assembly is further capable of recording an audio signal along with the video signal to the storage medium.

3. The image capture device as claimed in claim 1, wherein said image recording and playing assembly is further capable of recording an audio signal along with the video signal to the storage medium, wherein the audio signal includes information describing an object in the image corresponding to a position of the cursor superimposed onto the video signal.

4. The image capture device as claimed in claim 1, further comprising a housing suitable for being comfortably held in a hand of the user, the image sensor, image recording and playing assembly, cursor generator, and cursor control assembly being disposed in the housing.

5. The image capture device as claimed in claim 1, wherein the cursor control assembly comprises a control operable by a fingertip of the user for controlling the position of the cursor with respect to the image.

6. A video camera, comprising:
   a viewfinder for aiming the video camera at a subject;
   an image sensor for capturing an image of the subject;
   a storage medium compartment for containing a storage medium;
   an image recording and playing assembly for recording the image as a video signal to the storage medium contained in the storage medium compartment;
   a cursor generator for superimposing a cursor onto the video signal as the video signal is recorded the storage medium by said image recording and playing assembly; and
   a cursor control assembly, operable by a user, for controlling the position of the cursor with respect to the image,
   wherein the video signal may be played back from the storage medium along with the superimposed cursor.

7. The video camera as claimed in claim 6, wherein said image recording and playing assembly is further capable of recording an audio signal along with the video signal to the storage medium.

8. The video camera as claimed in claim 6, wherein said image recording and playing assembly is further capable of recording an audio signal along with the video signal to the storage medium, wherein the audio signal includes information describing an object in the image corresponding to a position of the cursor superimposed onto the video signal.

9. The video camera as claimed in claim 6, further comprising a housing suitable for being comfortably held in a hand of the user, the viewfinder, image sensor, storage medium compartment, image recording and playing assembly, cursor generator, and cursor control assembly being disposed in the housing.

10. The video camera as claimed in claim 6, wherein the cursor control assembly comprises a control operable by a fingertip of the user for controlling the position of the cursor with respect to the image.

11. A video camera, comprising:
    an image sensor for capturing an image of a subject;
    an image recording and playing assembly for recording the image as a video signal to a storage medium;
    a cursor generator for superimposing a cursor onto the video signal as the video signal is recorded the storage medium by said image recording and playing assembly; and
    a cursor control assembly, operable by a user, for controlling the position of the cursor with respect to the image,
    wherein said image recording and playing assembly is further capable of recording an audio signal along with the video signal to the storage medium, wherein the audio signal includes information describing an object in the image corresponding to a position of the cursor superimposed onto the video signal so that the video signal may be played back from the storage medium along with the superimposed cursor and audio signal.

12. An image capture device for recording images to a storage medium, comprising:
    an image sensor for generating a signal representing an image to be recorded;
    a circuit for receiving the signal and superimposing a cursor onto the image for recording to the storage medium;
    a cursor control assembly for controlling the relative position of the cursor with respect to the image; and
    a cursor generator responsive to said cursor control assembly for generating the cursor superimposed onto the image,
    wherein said cursor control assembly comprises a pointing stick operable by a user of the device to control the position of the cursor on the image.

13. The image capture device of claim 12, wherein the storage medium comprises magnetic tape.

14. The image capture device of claim 12, wherein the storage medium comprises an optical disc.

15. The image capture device of claim 12, wherein the storage medium comprises a magnetic disk.

16. The image capture device of claim 12, wherein the storage medium comprises a memory device.

17. An image capture device for recording images to a storage medium, comprising:

an image sensor for generating a signal representing an image to be recorded;

a circuit for receiving the signal and superimposing a cursor onto the image for recording to the storage medium;

a cursor control assembly for controlling the relative position of the cursor with respect to the image; and a cursor generator responsive to said cursor control assembly for generating the cursor superimposed onto the image, wherein said cursor control assembly comprises a trackball operable by a user of the device to control the position of the cursor on the image.

18. An image capture device for recording images to a storage medium, comprising:

an image sensor for generating a signal representing an image to be recorded;

a circuit for receiving the signal and superimposing a cursor onto the image for recording to the storage medium;

a cursor control assembly for controlling the relative position of the cursor with respect to the image; and a cursor generator responsive to said cursor control assembly for generating the cursor superimposed onto the image, wherein said cursor control assembly comprises a touch sensitive surface operable by a user of the device to control movement of the cursor over the image.

19. A video camera for recording video information to a storage medium, comprising:

an image sensor for generating a signal representing an image to be recorded as video information;

a circuit for receiving the signal and superimposing a cursor onto the image for recording to the storage medium;

a cursor control assembly for controlling the relative position of a cursor with respect to the image; and a cursor generator responsive to said cursor control assembly for generating the cursor superimposed onto the image, wherein said cursor control assembly comprises a pointing stick operable by a user of the video camera to control the position of the cursor on the image.

20. A video camera for recording video information to a storage medium, comprising:

an image sensor for generating a signal representing an image to be recorded as video information;

a circuit for receiving the signal and superimposing a cursor onto the image for recording to the storage medium;

a cursor control assembly for controlling the relative position of a cursor with respect to the image; and a cursor generator responsive to said cursor control assembly for generating the cursor superimposed onto the image, wherein said cursor control assembly comprises a trackball operable by a user of the video camera to control the position of the cursor on the image.

21. A video camera for recording video information to a storage medium, comprising:

an image sensor for generating a signal representing an image to be recorded as video information;

a circuit for receiving the signal and superimposing a cursor onto the image for recording to the storage medium;

a cursor control assembly for controlling the relative position of a cursor with respect to the image; and a cursor generator responsive to said cursor control assembly for generating the cursor superimposed onto the image, wherein said cursor control assembly comprises a touch sensitive surface operable by a user of the video camera to control movement of the cursor over the image.

22. A digital camera for recording digital images to a storage medium, comprising:

an image sensor for generating a signal representing an digital image;

a circuit for receiving the signal and superimposing a cursor onto the digital image for recording to the storage medium;

a cursor control assembly for controlling the relative position of the cursor with respect to the image; and a cursor generator responsive to said cursor control assembly for generating the cursor superimposed onto the image, wherein said cursor control assembly comprises a pointing stick operable by a user of the digital camera to control the position of the cursor on the image.

23. A digital camera for recording digital images to a storage medium, comprising:

an image sensor for generating a signal representing an digital image;

a circuit for receiving the signal and superimposing a cursor onto the digital image for recording to the storage medium;

a cursor control assembly for controlling the relative position of the cursor with respect to the image; and a cursor generator responsive to said cursor control assembly for generating the cursor superimposed onto the image, wherein said cursor control assembly comprises a trackball operable by a user of the digital camera to control the position of the cursor on the image.

24. A digital camera for recording digital images to a storage medium, comprising:

an image sensor for generating a signal representing an digital image;

a circuit for receiving the signal and superimposing a cursor onto the digital image for recording to the storage medium;

a cursor control assembly for controlling the relative position of the cursor with respect to the image; and a cursor generator responsive to said cursor control assembly for generating the cursor superimposed onto the image, wherein said cursor control assembly comprises a touch sensitive surface operable by a user of the digital camera to control movement of the cursor over the image.

* * * * *